US012691038B2

(12) United States Patent
Adams et al.

(10) Patent No.: US 12,691,038 B2
(45) Date of Patent: Jul. 28, 2026

(54) AUTOMATED DRUG FILLING PROCESS

(71) Applicant: AMGEN INC., Thousand Oaks, CA (US)

(72) Inventors: Benjamin J. Adams, Medford, MA (US); Mingfen Tsai, East Greenwich, RI (US)

(73) Assignee: AMGEN INC., Thousand Oaks, CA (US)

( * ) Notice: Subject to any disclaimer, the term of this patent is extended or adjusted under 35 U.S.C. 154(b) by 12 days.

(21) Appl. No.: 18/836,822

(22) PCT Filed: Mar. 13, 2023

(86) PCT No.: PCT/US2023/015058
§ 371 (c)(1),
(2) Date: Aug. 8, 2024

(87) PCT Pub. No.: WO2023/177598
PCT Pub. Date: Sep. 21, 2023

(65) Prior Publication Data
US 2025/0213430 A1      Jul. 3, 2025

Related U.S. Application Data

(60) Provisional application No. 63/319,675, filed on Mar. 14, 2022.

(51) Int. Cl.
*A61J 1/22*          (2006.01)
*G01G 13/02*       (2006.01)
*G01G 17/06*       (2006.01)

(52) U.S. Cl.
CPC .............. *A61J 1/22* (2013.01); *G01G 13/022* (2013.01); *G01G 17/06* (2013.01); *A61J 2200/74* (2013.01); *A61J 2200/76* (2013.01)

(58) Field of Classification Search
CPC ......... B65B 3/28; G01G 17/06; A61J 2200/74
See application file for complete search history.

(56) References Cited

U.S. PATENT DOCUMENTS 4,605,047 A      8/1986    Bausch et al.
5,348,062 A      9/1994    Hartzell et al.
(Continued)

FOREIGN PATENT DOCUMENTS

WO      WO-2022132544 A1 *  6/2022  ............. B65B 7/145

OTHER PUBLICATIONS

Written Opinion and International Search Report mailed Jun. 21, 2023.
(Continued)

*Primary Examiner* — Timothy L Maust
(74) *Attorney, Agent, or Firm* — MARSHALL, GERSTEIN & BORUN LLP

(57)          ABSTRACT

An automatic drug substance (DS) fill system is provided, comprising: a plurality of pumps, each configured to fill a respective DS container; a plurality of weighing scales, each configured to measure weights associated with each respective DS container; and a controller configured to: cause each of the plurality of pumps to fill each respective DS container; monitor the weights associated with each respective DS container measured by the weighing scales; compare the weights associated with each respective DS container, measured by the weighing scales, to a threshold weight; and cause each of the plurality of pumps to cease filling each respective DS container based on the weight associated with their respective DS container reaching the threshold weight.

12 Claims, 8 Drawing Sheets

(56)                References Cited

U.S. PATENT DOCUMENTS

| | | | |
|---|---|---|---|
| 5,402,834 A | | 4/1995 | Levin et al. |
| 5,404,920 A * | | 4/1995 | Custer .................... G01G 13/24 |
| | | | 222/266 |
| 5,505,233 A | | 4/1996 | Roberts et al. |
| 6,547,107 B2 | | 4/2003 | Hiramoto et al. |
| 6,712,963 B2 | | 3/2004 | Schick |
| 7,117,901 B2 | | 10/2006 | Martinell Gisper-Sauch et al. |
| 7,343,224 B2 * | | 3/2008 | DiGianfilippo ........ G16H 40/63 |
| | | | 700/265 |
| 8,408,257 B2 | | 4/2013 | Ono et al. |
| 9,045,725 B2 | | 6/2015 | Vogel et al. |
| 9,283,521 B2 | | 3/2016 | Schick et al. |
| 9,481,477 B2 | | 11/2016 | Kjar |
| 9,493,254 B2 | | 11/2016 | Boira Bonhora |
| 9,700,844 B2 | | 7/2017 | Schick |
| 10,001,454 B2 | | 6/2018 | Schick et al. |
| 10,641,648 B2 | | 5/2020 | Landini |

| | | | |
|---|---|---|---|
| 11,691,866 B2 * | 7/2023 | Zumbrum | ............... B65B 37/02 |
| | | | 141/144 |
| 2003/0102169 A1 | 6/2003 | Balboni et al. | |
| 2005/0109795 A1* | 5/2005 | Furey | .................. F04B 43/1253 |
| | | | 222/63 |
| 2005/0278066 A1 | 12/2005 | Graves et al. | |
| 2007/0119121 A1 | 5/2007 | Woods et al. | |
| 2013/0255833 A1 | 10/2013 | Runft et al. | |
| 2015/0034207 A1 | 2/2015 | Boira Bonhora | |
| 2015/0367304 A1 | 12/2015 | Aouad | |
| 2016/0193114 A1 | 7/2016 | Hellenbrand | |
| 2017/0341786 A1 | 11/2017 | Zacche' | |
| 2021/0223082 A1 | 7/2021 | Bernacki et al. | |
| 2022/0401305 A1 | 12/2022 | Brakkee et al. | |

OTHER PUBLICATIONS

Eurasian Patent Application No. 20249235, Office Action, mailed Jan. 9, 2025.

* cited by examiner

| Female End View | Male End View |
|---|---|
| 4<br><br>3 — ⊕ — 1<br><br>2 | 4<br><br>1 — ⊕ — 3<br><br>2 |
| 1 = Brown<br>2 = White<br>3 = Blue<br>4 = Black | 1 = Brown<br>2 = White<br>3 = Blue<br>4 = Black |

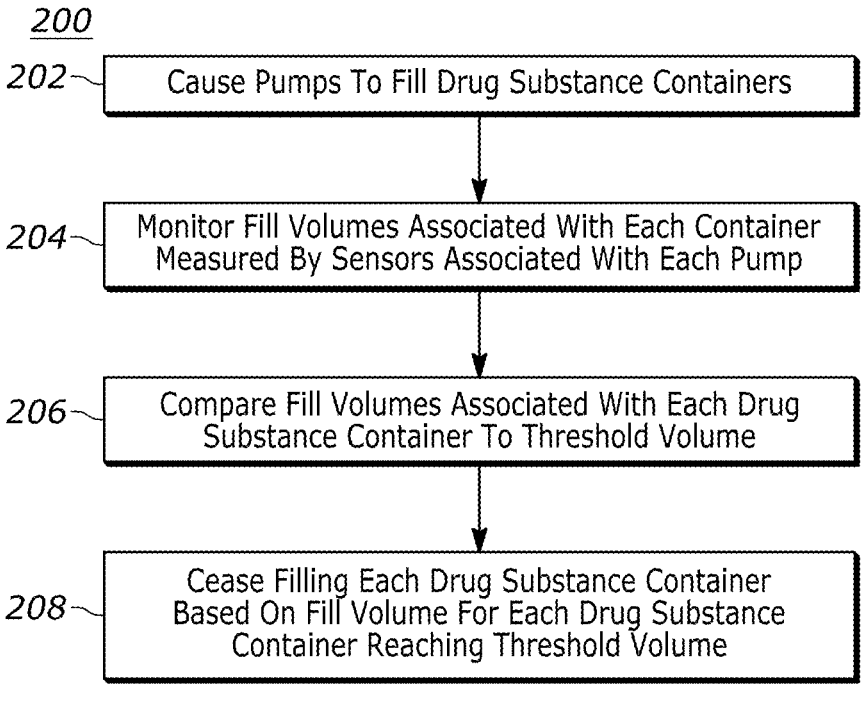

*200*

202 — Cause Pumps To Fill Drug Substance Containers

204 — Monitor Fill Volumes Associated With Each Container Measured By Sensors Associated With Each Pump 206 — Compare Fill Volumes Associated With Each Drug Substance Container To Threshold Volume 208 — Cease Filling Each Drug Substance Container Based On Fill Volume For Each Drug Substance Container Reaching Threshold Volume

FIG. 8

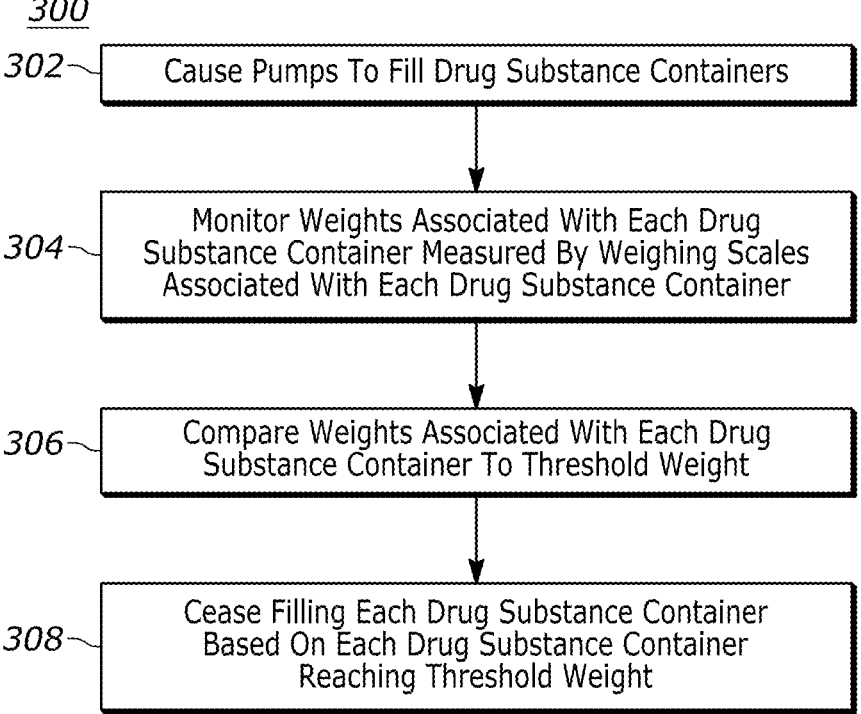

*300*

302 — Cause Pumps To Fill Drug Substance Containers

304 — Monitor Weights Associated With Each Drug Substance Container Measured By Weighing Scales Associated With Each Drug Substance Container 306 — Compare Weights Associated With Each Drug Substance Container To Threshold Weight 308 — Cease Filling Each Drug Substance Container Based On Each Drug Substance Container Reaching Threshold Weight

FIG. 9

AUTOMATED DRUG FILLING PROCESS

CROSS REFERENCE TO RELATED APPLICATIONS

This application claims priority to and the benefit of PCT Application No. PCT/US23/15058, filed on Mar. 13, 2024, entitled "AUTOMATED DRUG FILLING PROCESS", which claims priority to U.S. Provisional Application No. 63/319,675, filed on Mar. 14, 2022, entitled "AUTOMATED DRUG FILLING PROCESS," the entire disclosures of each of which are expressly incorporated by reference herein.

FIELD OF THE DISCLOSURE

The present disclosure generally relates to filling containers and, more particularly, to an automatic drug substance (DS) fill system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Existing drug substance (DS) fill processes require significant time and labor at large scale good manufacturing practice (GMP) manufacture. The standard existing DS fill method requires operators to manually fill one container at a time, with the fill volume being controlled by an operator who manipulates a hand valve while visually monitoring a scale display to reach the desired mass.

SUMMARY

In one aspect, an automatic drug substance (DS) fill system is provided, the system comprising: a plurality of pumps, each pump configured to fill a respective DS container of a plurality of DS containers; a plurality of weighing scales, each weighing scale configured to measure weights associated with each respective DS container of the plurality of DS containers; and a controller configured to: cause each of the plurality of pumps to fill each respective DS container, of the plurality of DS containers; monitor the weights associated with each respective DS container, of the plurality of DS containers measured by each of the plurality of weighing scales; compare the weights associated with each respective DS container, of the plurality of DS containers measured by each of the plurality of weighing scales, to a threshold weight; and cause each of the plurality of pumps to cease filling each respective DS container, of the plurality of DS containers, based on the weight associated with their respective DS container reaching the threshold weight.

In another aspect, an automatic DS fill system is provided, the system comprising: a plurality of pumps, each pump configured to fill a respective DS container of a plurality of DS containers; a plurality of sensors, each sensor configured to measure a volume of a DS flowing from each of the plurality of pumps into each respective DS container of the plurality of DS containers; and a controller configured to: cause each of the plurality of pumps to fill each respective DS container, of the plurality of DS containers; monitor the fill volume from each of the plurality of pumps into each respective DS container into the plurality of DS containers;

compare the fill volume associated with each respective DS container, of the plurality of DS containers, measured by each of the sensors, to a threshold volume; and cause each of the plurality of pumps to cease filling each respective DS container, of the plurality of DS containers, based on the fill volume associated with their respective DS container reaching the threshold volume.

In still another aspect, an automatic DS fill method is provided, the method comprising: causing, by a controller, each of a plurality of pumps to fill each a respective DS container, of a plurality of DS containers; monitoring, by a plurality of weighing scales, each weighing scale associated with a respective DS container of the plurality of DS containers, weights associated with each respective DS container; comparing, by the controller, the weights associated with each respective DS container, of the plurality of DS containers measured by each of the plurality of weighing scales, to a threshold weight; and causing, by the controller, each of the plurality of pumps to cease filling each respective DS container, of the plurality of DS containers, based on the weight associated with their respective DS container reaching the threshold weight.

In yet another aspect, an automatic DS fill method is provided, the method comprising: causing, by a controller, each of a plurality of pumps to fill each a respective DS container, of a plurality of DS containers; monitoring, by a plurality of sensors, each sensor associated with a respective DS container of the plurality of DS containers, fill volumes associated with each respective DS container; comparing, by the controller, the fill volumes associated with each respective DS container, of the plurality of DS containers measured by each of the plurality of weighing scales, to a threshold volume; and causing, by the controller, each of the plurality of pumps to cease filling each respective DS container, of the plurality of DS containers, based on the fill volume associated with their respective DS container reaching the threshold volume.

BRIEF DESCRIPTION OF THE DRAWINGS

FIG. 8 is a flow diagram of an example automatic dose-pump controlled DS fill method as may be used in the automatic DS fill system of FIG. 7, in accordance with some examples provided herein.

FIG. 9 is a flow diagram of an example automatic scale-controlled DS fill method as may be used in the automatic DS fill system of FIG. 7, in accordance with some examples provided herein.

DETAILED DESCRIPTION

Overview

Figure 1:
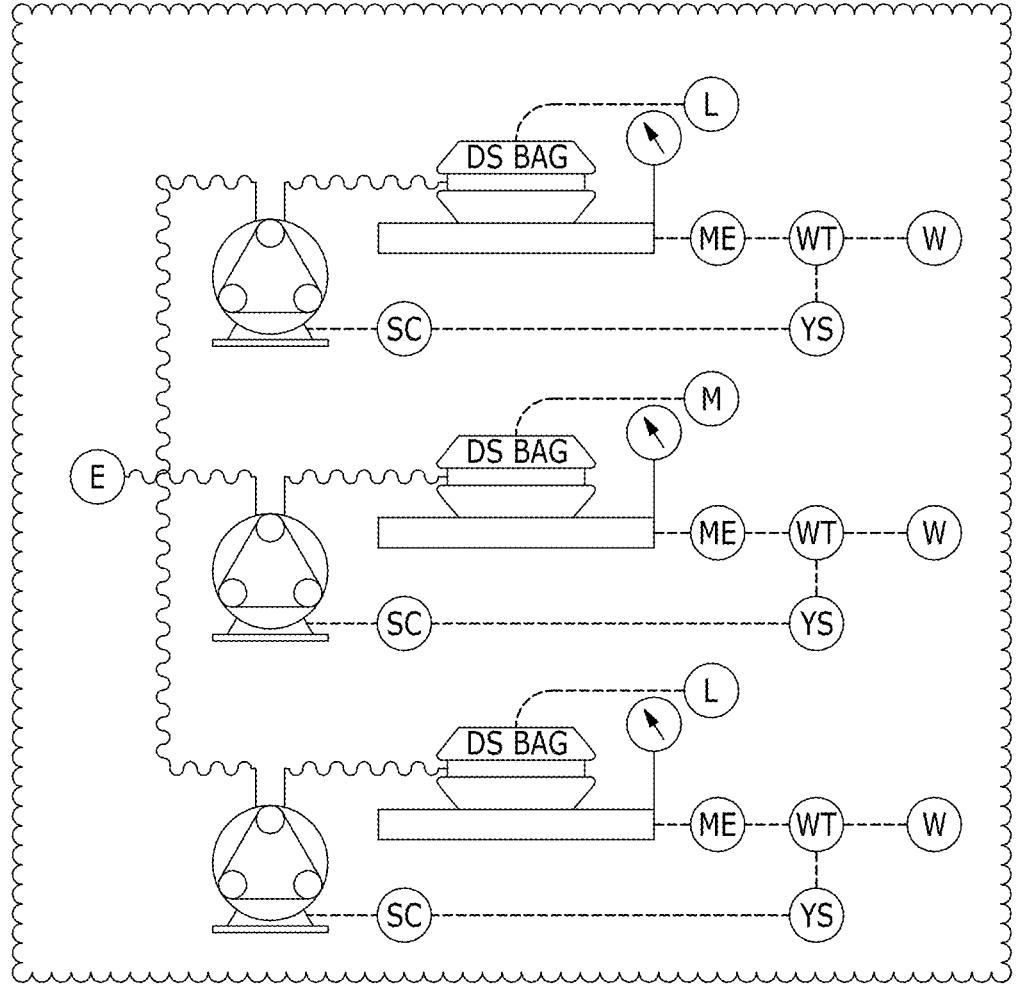
FIG. 1 illustrates an example piping and instrumentation diagram (P&ID) for an automatic drug substance (DS) fill system, in accordance with some examples provided herein.

The present disclosure provides an automatic drug substance (DS) fill system, in which DS containers are filled based on a target volume and/or a target mass or weight in a closed system. A piping and instrumentation diagram (P&ID) of example DS fill system as provided herein is illustrated at FIG. 1. For instance, in a dose pump-controlled DS fill system, DS containers may be filled to a target fill volume based on measurements from pump-head rotation sensors associated with each DS container, while in a scale-controlled DS fill system, DS containers may be filled to a target mass or weight based on measurements from weighing scales associated with each DS container.

In an example, a novel dose pump-controlled DS fill system disclosed herein automatically fills multiple (e.g., three, six, etc.) DS containers at once near a target volume without requiring the operator to manually control fill volumes. The pump-controlled DS fill system is comprised of multiple peristaltic dose pumps that automatically transfer a user programmable volume of DS into a container. Aseptic tubing assemblies divide the fill line into multiple streams and connect to multiple DS containers via a sealed, sterile connection, allowing multiple DS containers to be filled simultaneously. Users operate the equipment via local keypads and displays.

In another example, a novel scale-controlled DS fill system disclosed herein automatically fills multiple (e.g., three, six, etc.) DS containers at once to a target mass without requiring the operator to monitor or manually control fill volumes. The scale-controlled DS fill system is comprised of multiple sets of equipment each including a scale, weigh terminal (note: in some examples described herein, the "weigh terminal" may be referred to as a "controller."), and peristaltic pump that integrate to automatically transfer a user programmable mass of DS into a container. An empty DS container is filled on a scale that is connected to a weigh terminal that is programmed to stop the peristaltic pump transferring the DS once a target weight has been measured. Aseptic tubing assemblies divide the fill line into multiple streams and connect to multiple DS containers via a sealed, sterile connection, allowing allowing multiple DS containers to be filled simultaneously. Users operate the equipment via local keypads and displays.

The scale-controlled DS fill system provides a fast, automatic, consistent, and easy to use DS fill process. The ability of the scale-controlled DS fill system to fill to target is not impacted by variable process conditions such as upstream fill line pressure which sets it apart from a fill system controlled entirely by peristaltic dose pumps. The ability to fill multiple containers at once significantly decreases the duration of the fill process while the highly accurate and precise control enables the container to automatically be filled closer to its maximum capacity which optimizes use of all fill and shipping associated single-use materials and labor.

In any case, the automatic DS fill systems provided herein provide a fast and automatic DS fill process. The automatic target fill control combined with the ability to fill multiple containers at once significantly decreases the duration of the fill process. Moreover, the use of pumps, rather than valves, to control the fill of each of the DS containers allows for improved speed and safety in the automatic DS fill process provided herein. For instance, compared to conventional systems, which may include a single pump (or a plurality of centralized pumps) and utilize valves to modulate flow into each container, the present techniques prevent dangerous buildup of pressure and liquid in the system by using individualized pumps for each container. That is, if an operator chooses to stop the fill by shutting off the individualized pumps, the pumps will stop pulling the liquid from the source, so the possibility of liquid or pressure exceeding the capacity of the tubing, which may lead to tubing rupturing, is greatly decreased compared to systems in which a valve connected to a centralized pump is closed. Moreover, using individualized pumps for each container allows operators to more quickly and easily stop the fill at the individual container level if needed, because there is no requirement to shut off both a pump and a valve to do so.

The automatic DS fill systems provided herein include tabletop equipment designed to provide automatic, accurate, and repeatable filling into multiple DS bags (e.g., Sartorius Celsius® FTT bags) simultaneously. In particular, the automatic DS fill systems provided herein include multiple (e.g., three, six, etc.) sets of equipment each including a peristaltic pump (e.g., a Watson-Marlow 520Di peristaltic pump). In some examples, the pumps use a 505L pump head equipped with a 505LG track assembly.

In the case of the dose pump-controlled DS system, the peristaltic dose pumps may be standardized offline at process fill line pressure to allow pump-head rotation sensors to estimate pump throughput when connected to the fill line. Using the standardization data, the required pump head rotations to transfer the target volume (also called "threshold volume" herein) of DS into the container may be calculated.

Figure 2:
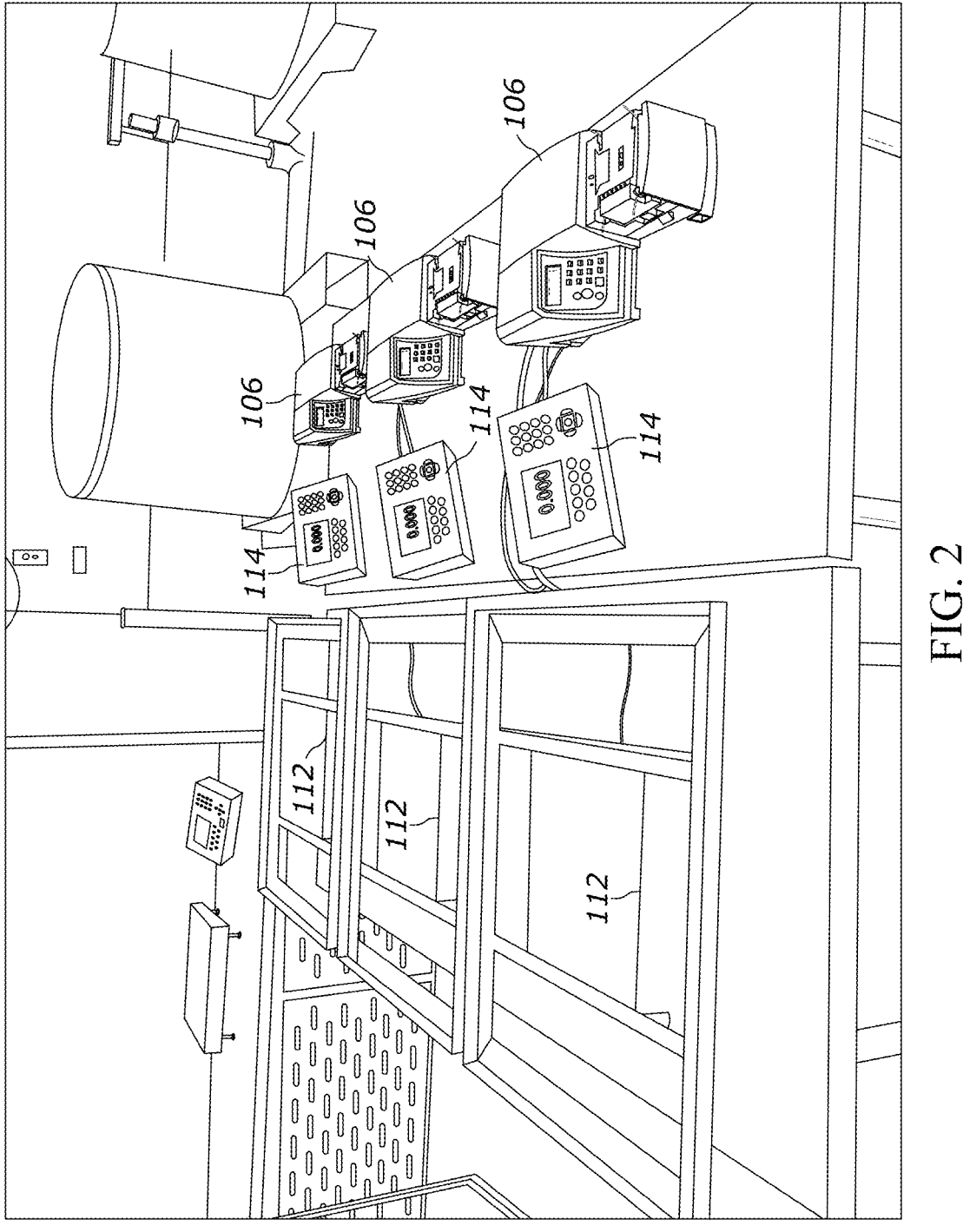
FIG. 2 illustrates example weighing scales and controllers that may be used in an automatic DS fill system, in accordance with some examples provided herein.
Figures 3A, 3B:
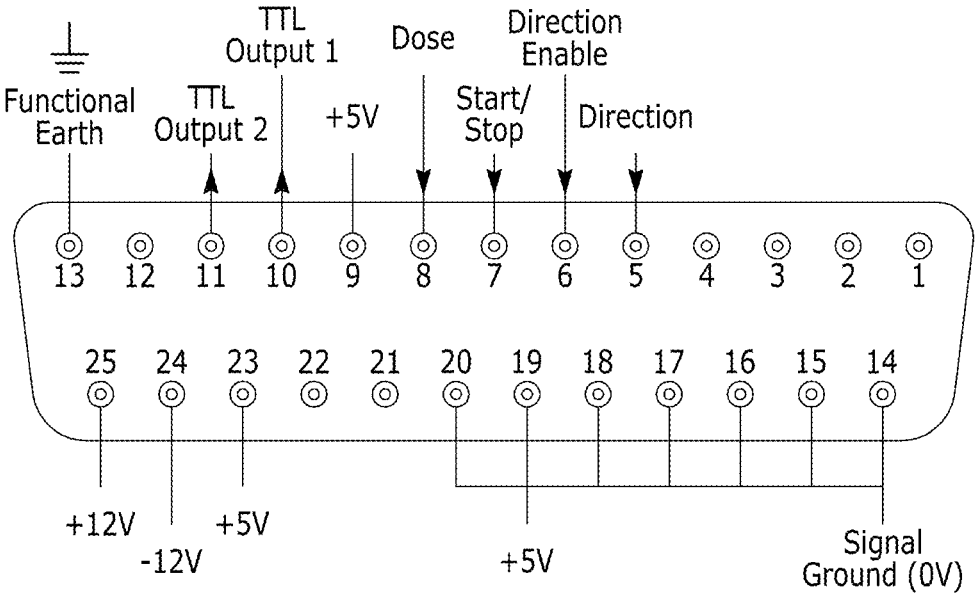
FIGS. 3A and 3B illustrate example ports connecting a controller to a pump that may be used in an automatic DS fill system, in accordance with some examples provided herein.

In the case of the scale-controlled DS fill system, each set of equipment also includes a weighing scale. Additionally, in the case of the scale-controlled DS fill system, each set of equipment further includes a weighing terminal (e.g., a Mettler Toledo PBK989 AB60 scale platform and a Mettler Toledo IND-570 weighing terminal, as shown at FIG. 2). The equipment in each set may interconnect, allowing the weigh terminal to both read the scale and control the pump. In an example, the pump is connected to the weigh terminal by a cable, e.g., a Turck cable with a 25 pin connector end, e.g., as shown at FIGS. 3A and 3B.

Figure 4:
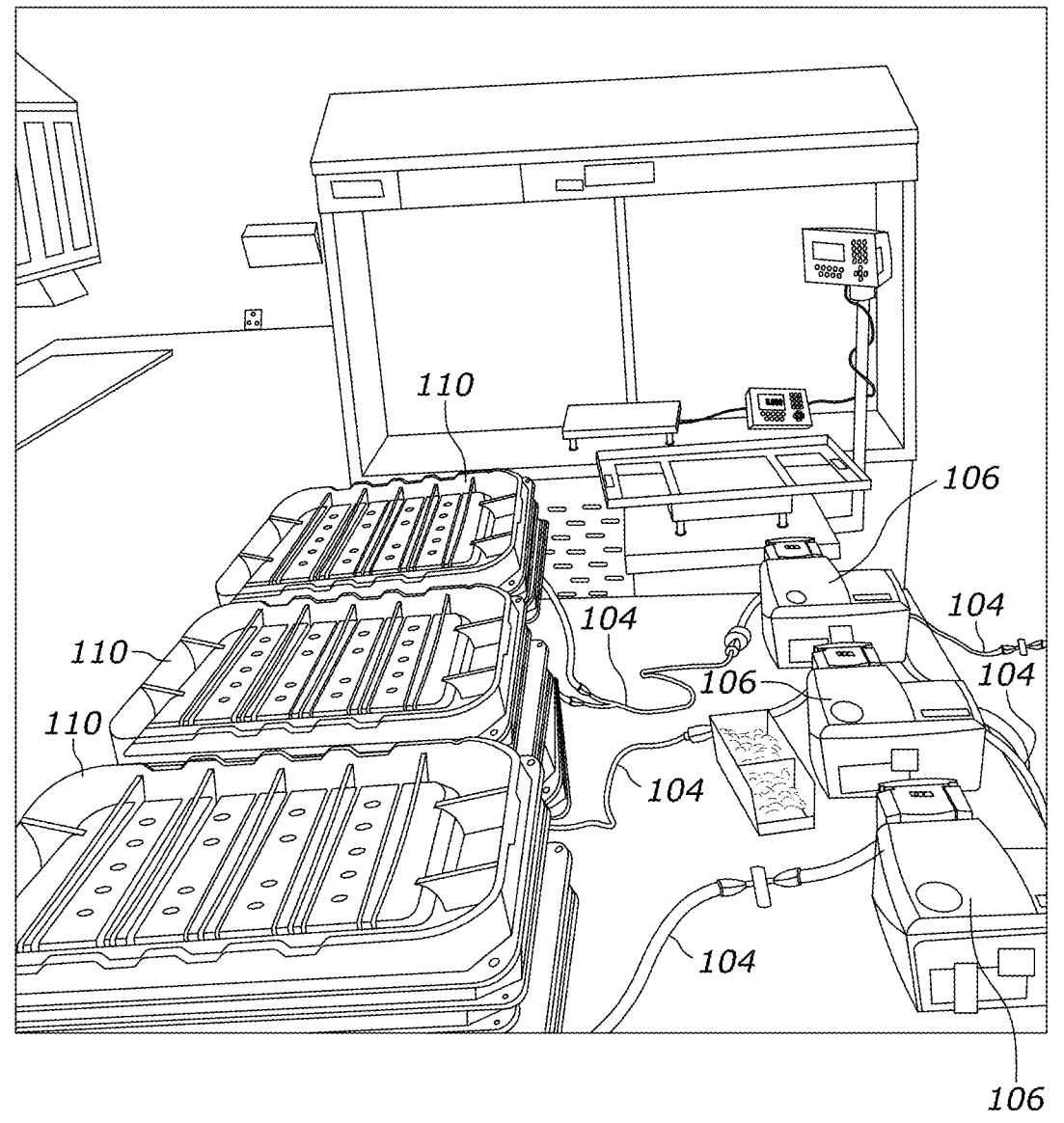
FIG. 4 illustrates an example of several DS containers connected to respective pumps by a tubing manifold via a sealed, sterile connection, as may be used in an automatic DS fill system, in accordance with some examples provided herein.
Figure 5:
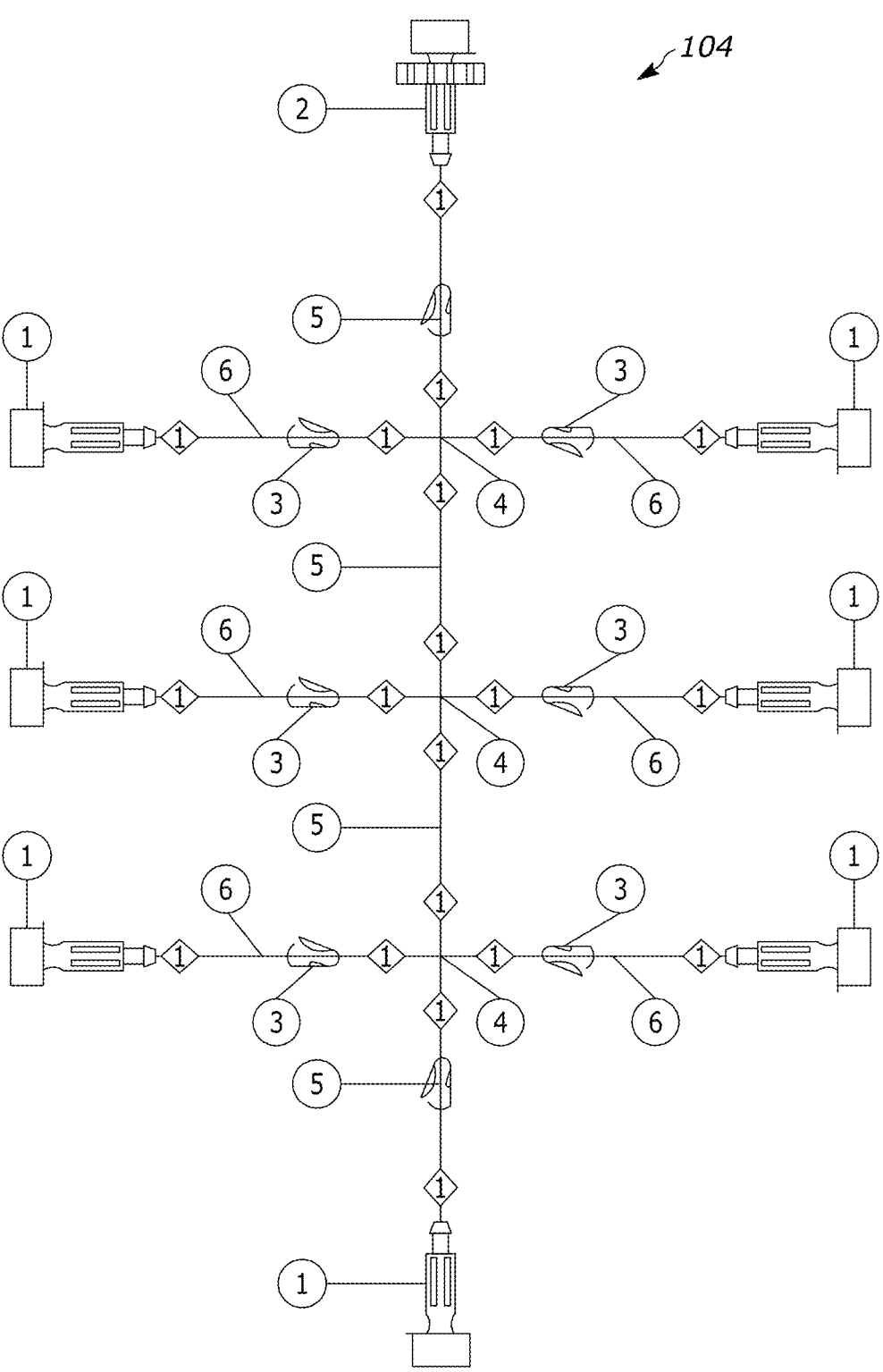
FIG. 5 illustrates an example tubing manifold that may be used in an automatic DS fill system, in accordance with some examples provided herein.

In any case, an empty pair of DS bags is aseptically connected (e.g., via a sealed, sterile connection) via gendered connectors (e.g., Sartorius Opta® connectors, AseptiQuik® G Connectors, etc.) to each of the separate legs of the transfer assembly manifold, e.g., as shown at FIG. 4. For instance, FIG. 5 illustrates an example tubing manifold. The legs of the transfer assembly manifold that are connected to the DS bags are each loaded into a separate pump. A flow path to one of the bags in each pair is set by the operator.

In the case of the dose pump-controlled DS system, each may run until the calculated number of pump head rotations is completed.

Figure 6:
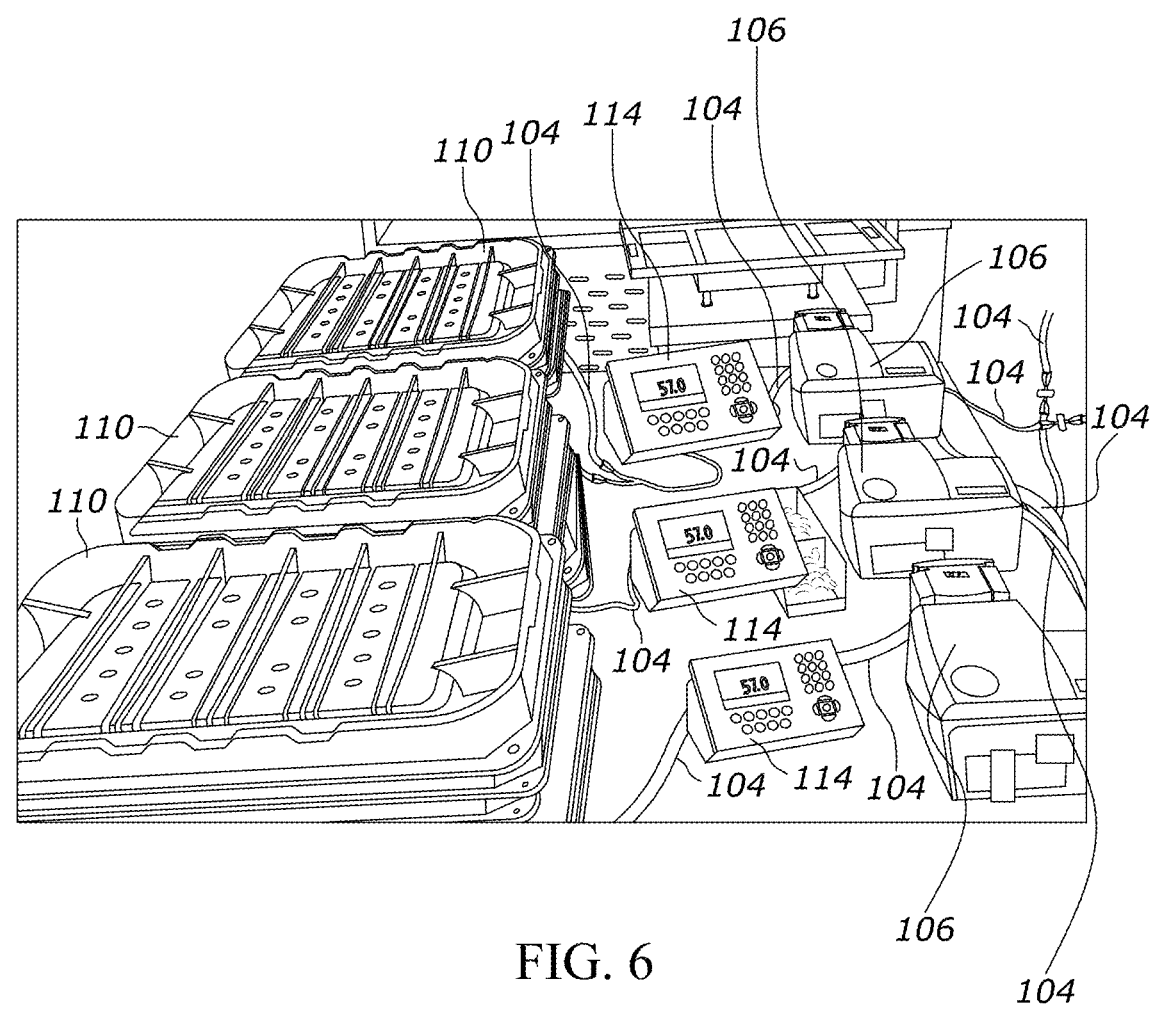
FIG. 6 illustrates an example of several DS containers connected to respective pumps by a tubing manifold via a sealed, sterile connection, e.g., as in FIG. 4, and placed on respective weighing scales connected to respective controllers, as may be used in an automatic DS fill system, in accordance with some examples provided herein.

In the case of the scale-controlled DS fill system, each empty pair of DS bags is placed on a weighing scale, as shown at FIG. 6, and each pump may run until the programmed target mass (also called "threshold mass" or "threshold weight" herein) on the scale has been measured triggering the weigh terminal to stop the pump.

While the techniques provided herein are discussed with respect to a DS fill system, the techniques described herein may be used for other types of fills, including media fills, or fills using any other substance or liquid, in some embodiments. Similarly, while the techniques provided herein are discussed with respect to filling DS containers, the techniques described herein may be used for filling other types of containers, such as carboys, in some embodiments.

Example Automatic DS Fill System

Figure 7:
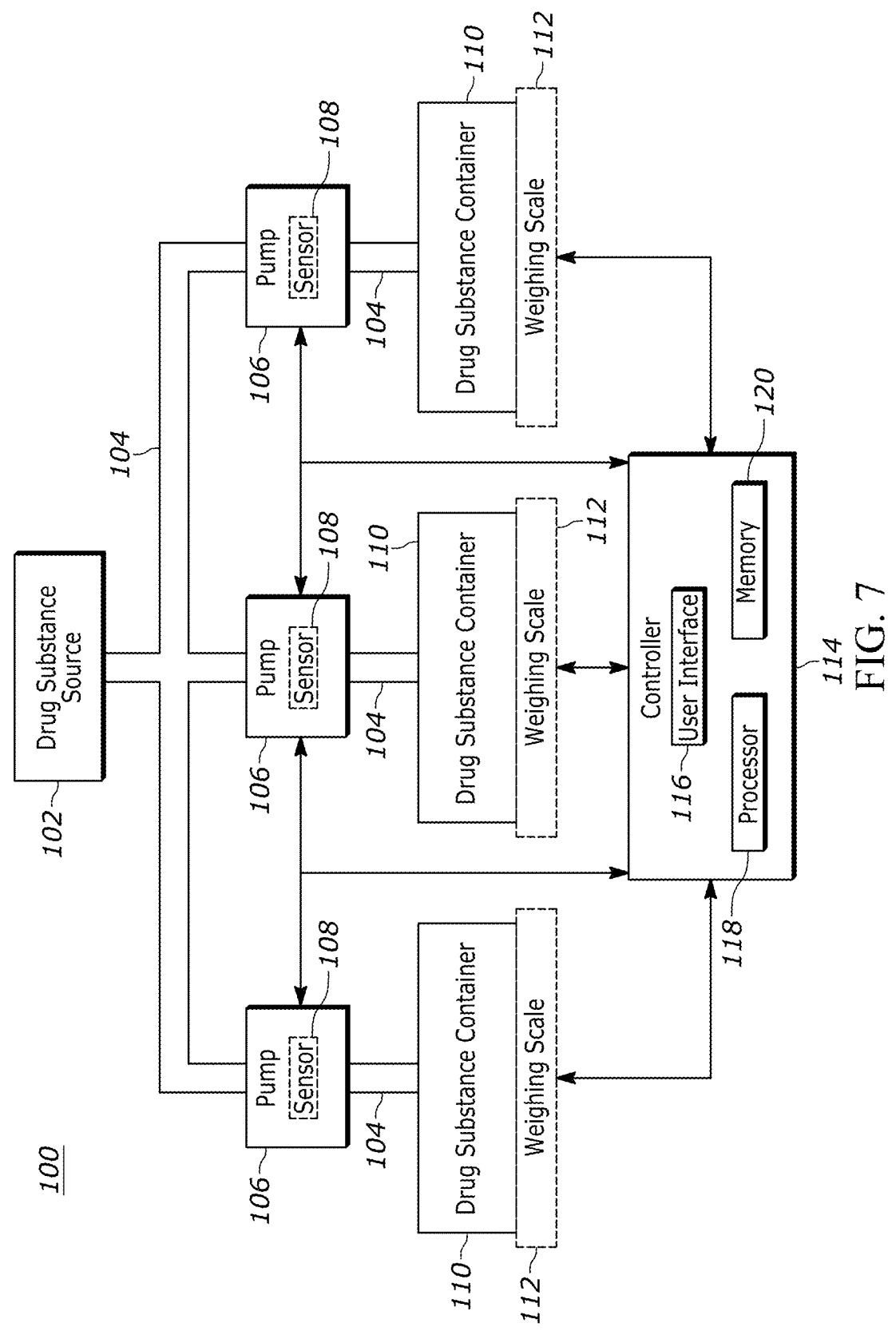
FIG. 7 is a block diagram of an example automatic DS fill system, in accordance with some examples provided herein.

FIG. 7 is a block diagram of an example automatic DS fill system 100, in accordance with some examples provided herein. The high-level architecture illustrated in FIG. 7 may include both hardware and software applications, as well as various data communications channels for communicating data between the various hardware and software components, as is described below.

The automatic DS fill system 100 may include a drug substance source 102 fluidly connected, by a tubing manifold 104, via a sealed, sterile connection, to two or more pumps 106, each configured to fill a respective drug substance container 110. In particular, the tubing manifold 104 may split the fill line from the drug substance source 102 into separate tubes for each drug substance container 110, and the pumps 106 for each drug substance container 110 may be positioned between the drug substance source 102 and the drug substance container 110, downstream from the splitting point. While three pumps 106, and three respective drug substance containers 110, are shown in FIG. 7, any number of pumps 106 and respective drug substance containers 110 may be included in the automatic DS fill system 100.

If the automatic DS fill system 100 is implemented as an automatic dose-pump controlled DS fill system, each of the pumps 106 may be associated with a respective sensor 108 configured to measure the fill volume from the pump 106 into its respective DS container 110, either directly, e.g., via a flow sensor, or indirectly, e.g., via a pump-head rotation sensor. For instance, the pumps 106 may be the peristaltic dose pumps, which may be standardized offline at process fill line pressure to allow pump-head rotation sensors 108 associated with each pump 106 to estimate throughput when connected to the fill line using the number of pump-head rotations.

On the other hand, if the automatic DS fill system 100 is implemented as an automatic scale-controlled DS fill system, each of the DS containers 110 may be associated with a respective weighing scale 112 configured to monitor the weight or mass of the DS container 110.

The automatic DS fill system 100 may include a controller 114 that is configured to control and communicate with each of the pumps 106, as well as either the sensor 108 associated with each pump 106 (in the case of the automatic dose-pump controlled DS fill system), or the weighing scale 112 associated with the DS container 110 that each pump 106 is filling (in the case of the automatic scale-controlled DS fill system), via respective wired or wireless connections. While FIG. 7 illustrates that all of the pumps 106 (and their respective sensors 108 or weighting scales 112) are controlled by the same controller 114, in some examples, each of the pumps 106 (and their respective sensors 108 or weighting scales 112) may be controlled by separate controllers 114. Moreover, while FIG. 7 illustrates that the controller 114 is separate from the pumps 106, in some examples, separate controllers 114 may be disposed internally or otherwise attached to each of the pumps 106.

The controller 114 may include or communicate with a user interface 116, via which the controller 114 may receive inputs from users and provide information to users. The controller 114 may further include one or more processors 118 and a memory 120 (e.g., volatile memory, non-volatile memory). The memory 120 may be accessible by the one or more processors 118 (e.g., via a memory controller). The one or more processors 118 may interact with the memory 120 to obtain, for example, computer-readable instructions stored in the memory 120. The computer-readable instructions stored in the memory 120 may cause the one or more processors 118 of the controller 114 to execute one or more applications. In particular, the computer-readable instructions stored in the memory 120 may include instructions that cause the controller 114 to control each pump 106 to begin filling its respective DS container 110, and to either monitor the fill volume associated with each DS container 110 using data received from the sensor 108 associated with the pump 106 filling the DS container 110 (in the case of the automatic dose-pump controlled DS fill system), or monitor the weight or mass associated with each DS container 110 using data received from the weighing scale 112 associated with the DS container 110 (in the case of the automatic scale-controlled DS fill system). The computer-readable instructions stored in the memory 120 may further include instructions that cause the controller 114 to cease filling each pump 106 (in some cases, separately from the other pumps 106) based on a target or threshold for the DS container 110 associated with that pump 106 being reached. In the case of the automatic dose-pump controlled DS fill system, the target or threshold is a target fill volume or a threshold fill volume, while in the case of the automatic scale-controlled DS fill system, the target or threshold is a target or threshold weight or mass.

In some examples, the computer-readable instructions stored in the memory 120 may further include instructions for receiving input from users indicating target or threshold volumes, masses, or weights for each DS container 110, e.g., via the user interface 116. Additionally, in some examples, the computer-readable instructions stored in the memory 120 may further include instructions for providing audio or visual alerts to users via the user interface 116, e.g., alerts indicating that the target or threshold volume, mass, or weight for one of the DS containers 110 has been reached.

Furthermore, in some examples, the computer-readable instructions stored on the memory 120 may include instructions for carrying out any of the steps of the method 200, described in greater detail below with respect to FIG. 8, and/or the method 300, described in greater detail below with respect to FIG. 9.

Example Automatic Dose-Pump Controlled DS Fill Method

FIG. 8 is a flow diagram of an example automatic dose-pump controlled DS fill method 200 as may be used in the automatic DS fill system 100 of FIG. 7, in accordance with some examples provided herein. One or more steps of the method 200 may be implemented as a set of instructions stored on a computer-readable memory (e.g., memory 120) and executable on one or more processors (e.g., processors 118).

The method 200 may begin when two or more pumps 106 are each controlled to begin filling (block 202) respective DS containers 110, e.g., by a controller 114. In some examples, each of the pumps 106 may be controlled by a separate controller 114, while in other examples, multiple pumps 106 may be controlled by the same controller 114. In any case, the pumps 106 may be controlled separately from one another to fill the DS containers 110, e.g., starting at different times, at different fill rates, etc., in some examples.

The fill volumes of the DS containers 110 associated with each of the pumps 106 may be monitored (block 204) by respective sensors 108 associated with each pump 106. For instance, the sensors may be pump-head rotation sensors, and the fill volume for a given pump 106 may be monitored based on the number of pump-head rotations detected by the sensor 108 associated with that pump 106. That is, the peristaltic dose pumps may be standardized offline at process fill line pressure to allow pump-head rotation sensors to estimate pump throughput when connected to the fill line. Using the standardization data, the required pump head rotations to transfer a target volume (also called "threshold volume" herein) of DS into the container may be calculated.

In some examples, the method 200 may include receiving an indication of a target volume or threshold volume requested by a user, e.g., via the user interface 116. In some examples, the target volume or threshold volume for each DS container 110 may be the same, while in other examples, the target volume or threshold volume for one of the DS containers 110 may be different than another of the DS containers 110 (e.g., based on the DS containers 110 being different sizes, etc.).

The fill volume of the DS container 110 associated with each pump 106 (e.g., as calculated based on the number of pump-head rotations) may be compared (block 206) to the threshold volume, e.g., by the controller(s) 114.

Each pump 106 may be controlled to cease filling (block 208) its respective DS container 110 based on the fill volume of the DS container 110 reaching the threshold volume. As discussed above, the pumps 106 may be controlled separately from one another to cease filling the DS containers 110, e.g., based on the target or threshold volume for each DS container 110 being different, and/or being reached at different times.

In some examples, the method 200 may further include generating (e.g., by the controller 114) respective alerts when each DS container 110 reaches the threshold volume or target volume, e.g., to be presented via the user interface 116.

Example Automatic Scale-Controlled DS Fill Method

FIG. 9 is a flow diagram of an example automatic scale-controlled DS fill method 300 as may be used in the automatic DS fill system 100 of FIG. 7, in accordance with some examples provided herein. One or more steps of the method 300 may be implemented as a set of instructions stored on a computer-readable memory (e.g., memory 120) and executable on one or more processors (e.g., processors 118).

The method 300 may begin when two or more pumps 106 are each controlled to begin filling (block 302) respective DS containers 110, e.g., by a controller 114. In some examples, each of the pumps 106 may be controlled by a separate controller 114, while in other examples, multiple pumps 106 may be controlled by the same controller 114. In any case, the pumps 106 may be controlled separately from one another to fill the DS containers 110, e.g., starting at different times, at different fill rates, etc., in some examples.

The weight or mass of each of the DS containers 110 may be monitored (block 304) by weighing scales 112 associated with each pump 106.

The weight or mass of each DS container 110, as measured by the weighing scale 112 associated with the DS container 110, may be compared (block 306) to a threshold weight or mass, e.g., by the controller(s) 114. In some examples, the method 300 may include receiving an indication of a threshold weight or threshold mass (or target weight or target mass) requested by a user, e.g., via the user interface 116. In some examples, the threshold weight or threshold mass (or target weight or target mass) for each DS container 110 may be the same, while in other examples, the threshold weight or threshold mass (or target weight or target mass) for one of the DS containers 110 may be different than another of the DS containers 110 (e.g., based on the DS containers 110 being different sizes, etc.).

In any case, each pump 106 may be controlled, e.g., by the controller 114 to cease filling (block 308) its respective DS container 110 based on the weight or mass of the DS container 110 reaching the threshold weight or mass. As discussed above, the pumps 106 may be controlled separately from one another to cease filling the DS containers 110, e.g., based on the threshold weight or threshold mass (or target weight or target mass) for each DS container 110 being different, and/or being reached at different times.

In some examples, the method 300 may further include generating (e.g., by the controller 114) respective alerts when each DS container 110 reaches the threshold weight or threshold mass (or target weight or target mass), e.g., to be presented via the user interface 116.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

1. An automatic drug substance (DS) fill system, comprising: a plurality of pumps, each pump configured to fill a respective DS container of a plurality of DS containers; a plurality of weighing scales, each weighing scale configured to measure weights associated with each respective DS container of the plurality of DS containers; and a controller configured to: cause each of the plurality of pumps to fill each respective DS container, of the plurality of DS containers; monitor the weights associated with each respective DS container, of the plurality of DS containers measured by each of the plurality of weighing scales; compare the weights associated with each respective DS container, of the plurality of DS containers measured by each of the plurality of weighing scales, to a threshold weight; and cause each of the plurality of pumps to cease filling each respective DS container, of the plurality of DS containers, based on the weight associated with their respective DS container reaching the threshold weight.

2. The automatic DS fill system of aspect 1, further comprising a tubing manifold configured to connect a fill line to each of the plurality of pumps via a sealed, sterile connection.

3. The automatic DS fill system of any one of aspects 1 or 2, further comprising a user interface, and wherein the controller is further configured to receive an indication of the threshold weight as an input via the user interface.

4. The automatic DS fill system of any one of aspects 1-3, wherein the controller is further configured to separately control each of the plurality of pumps to cease filling each respective DS container.

5. The automatic DS fill system of any one of aspects 1-4, wherein the controller is further configured to generate respective alerts based on the weight associated with each DS container reaching the threshold weight.

6. An automatic drug substance (DS) fill system, comprising: a plurality of pumps, each pump configured to fill a respective DS container of a plurality of DS containers; a tubing manifold configured to connect a fill line from a DS source to each of the plurality of pumps via a sealed, sterile connection; a plurality of sensors, each sensor configured to measure a volume of a DS flowing from each of the plurality of pumps into each respective DS container of the plurality of DS containers; and a controller configured to: cause each of the plurality of pumps to fill each respective DS container, of the plurality of DS containers; monitor the fill volume from each of the plurality of pumps into each respective DS container into the plurality of DS containers; compare the fill volume associated with each respective DS container, of the plurality of DS containers, measured by each of the sensors, to a threshold volume; and cause each of the plurality of pumps to cease filling each respective DS container, of the plurality of DS containers, based on the fill volume associated with their respective DS container reaching the threshold volume.

7. The automatic DS fill system of aspect 6, wherein the sensor is a pump-head rotation sensor.

8. The automatic DS fill system of any one of aspects 6 or 7, further comprising a user interface, and wherein the controller is further configured to receive an indication of the threshold volume as an input via the user interface.

9. The automatic DS fill system of any one of aspects 6-8, wherein the controller is further configured to separately control each of the plurality of pumps to cease filling each respective DS container.

10. The automatic DS fill system of any one of aspects 6-9, wherein the controller is further configured to generate respective alerts based on the fill volume associated with each DS container reaching the threshold volume.

11. An automatic drug substance (DS) fill method, comprising: causing, by a controller, each of a plurality of pumps to fill each a respective DS container, of a plurality of DS containers, wherein each of the plurality of pumps is connected to a fill line from a DS source by a tubing manifold via a sealed, sterile connection; monitoring, by a plurality of weighing scales, each weighing scale associated with a respective DS container of the plurality of DS containers, weights associated with each respective DS container; comparing, by the controller, the weights associated with each respective DS container, of the plurality of DS containers measured by each of the plurality of weighing scales, to a threshold weight; and causing, by the controller, each of the plurality of pumps to cease filling each respective DS container, of the plurality of DS containers, based on the weight associated with their respective DS container reaching the threshold weight.

12. The automatic DS fill method of aspect 11, further comprising: receiving, by the controller, an indication of the threshold weight as an input via a user interface.

13. The automatic DS fill method of any one of aspects 11 or 12, wherein causing, by the controller, each of the plurality of pumps to cease filling each respective DS container includes separately controlling each of the plurality of pumps to cease filling each respective DS container.

14. The automatic DS fill method of any one of aspects 11-13, further comprising, generating, by the controller, respective alerts based on the weight associated with each DS container reaching the threshold weight.

15. An automatic drug substance (DS) fill method, comprising: causing, by a controller, each of a plurality of pumps to fill each a respective DS container, of a plurality of DS containers; monitoring, by a plurality of sensors, each sensor associated with a respective DS container of the plurality of DS containers, fill volumes associated with each respective DS container; comparing, by the controller, the fill volumes associated with each respective DS container, of the plurality of DS containers measured by each of the plurality of weighing scales, to a threshold volume; and causing, by the controller, each of the plurality of pumps to cease filling each respective DS container, of the plurality of DS containers, based on the fill volume associated with their respective DS container reaching the threshold volume.

16. The automatic DS fill method of aspect 15, wherein the plurality of sensors are pump-head rotation sensors.

17. The automatic DS fill method of any one of aspects 15 or 16, further comprising: receiving, by the controller, an indication of the threshold volume as an input via a user interface.

18. The automatic DS fill method of any one of aspects 15-17, wherein causing, by the controller, each of the plurality of pumps to cease filling each respective DS container includes separately controlling each of the plurality of pumps to cease filling each respective DS container.

19. The automatic DS fill method of any one of aspects 15-18, further comprising, generating, by the controller, respective alerts based on the fill volume associated with each DS container reaching the threshold volume.

What is claimed is:

1. An automatic drug substance (DS) fill system, comprising:
   a plurality of pumps, each pump configured to fill a respective DS container of a plurality of DS containers;
   a plurality of weighing scales, each weighing scale configured to measure weights associated with each respective DS container of the plurality of DS containers; and
   a controller configured to:
   cause each of the plurality of pumps to simultaneously fill each respective DS container, of the plurality of DS containers;
   monitor the weights associated with each respective DS container of the plurality of DS containers measured by each of the plurality of weighing scales;
   compare the weights associated with each respective DS container, of the plurality of DS containers measured by each of the plurality of weighing scales, to a threshold weight; and
   independently control each pump of the plurality of pumps to cease filling each respective DS container based on the weight measured by the weighing scale associated with a respective pump's respective DS container reaching the threshold weight.

2. The automatic DS fill system of claim 1, further comprising a tubing manifold configured to connect a fill line from a DS source to each of the plurality of pumps via a sealed, sterile connection.

3. The automatic DS fill system of claim 1, further comprising a user interface, and wherein the controller is further configured to receive an indication of the threshold weight as an input via the user interface.

4. The automatic DS fill system of claim 1, wherein the controller is further configured to generate respective alerts based on the weight associated with each DS container reaching the threshold weight.

5. An automatic drug substance (DS) fill system, comprising:
   a plurality of pumps, each pump configured to fill a respective DS container of a plurality of DS containers;

a tubing manifold configured to connect a fill line from a DS source to each of the plurality of pumps via a sealed, sterile connection;
   a plurality of sensors, each sensor configured to measure a volume of a DS flowing from each of the plurality of pumps into each respective DS container of the plurality of DS containers; and
   a controller configured to:
   cause each of the plurality of pumps to simultaneously fill each respective DS container, of the plurality of DS containers;
   monitor the fill volume from each of the plurality of pumps into each respective DS container into the plurality of DS containers;
   compare the fill volume associated with each respective DS container, of the plurality of DS containers, measured by each of the sensors, to a threshold volume; and
   independently control each pump of the plurality of pumps to cease filling based on the fill volume measured by the sensor associated with a respective pump's respective DS container reaching the threshold volume.

6. The automatic DS fill system of claim 5, wherein the sensor is a pump-head rotation sensor.

7. The automatic DS fill system of claim 5, further comprising a user interface, and wherein the controller is further configured to receive an indication of the threshold volume as an input via the user interface.

8. The automatic DS fill system of claim 5 wherein the controller is further configured to generate respective alerts based on the fill volume associated with each DS container reaching the threshold volume.

9. An automatic drug substance (DS) fill method, comprising:
   causing, by a controller, each of a plurality of pumps to simultaneously fill each a respective DS container, of a plurality of DS containers;
   monitoring, by a plurality of sensors, each sensor associated with a respective DS container of the plurality of DS containers, fill volumes associated with each respective DS container;
   comparing, by the controller, the fill volumes associated with each respective DS container, of the plurality of DS containers measured by each of the plurality of sensors to a threshold volume; and
   independently controlling, by the controller, each pump of the plurality of pumps to cease filling each respective DS container based on the fill volume measured for a respective pump's respective DS container reaching the threshold volume.

10. The automatic DS fill method of claim 9, wherein the plurality of sensors are pump-head rotation sensors.

11. The automatic DS fill method of claim 9, further comprising: receiving, by the controller, an indication of the threshold volume as an input via a user interface.

12. The automatic DS fill method of claim 9, further comprising, generating, by the controller, respective alerts based on the fill volume associated with each DS container reaching the threshold volume.

\* \* \* \* \*